United States Patent
Bourbon et al.

(10) Patent No.: US 6,652,605 B1
(45) Date of Patent: Nov. 25, 2003

(54) PROCESS FOR PREPARATION OF A LITHIATED OR OVERLITHIATED TRANSITION METAL OXIDE, ACTIVE POSITIVE ELECTRODE MATERIALS CONTAINING THIS OXIDE, AND A BATTERY

(75) Inventors: Carole Bourbon, La Buisse (FR); Frédéric Le Cras, Montchaboud (FR); Franck Rouppert, St. Pierre de Bressieux (FR); Didier Bloch, BiViers (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/445,400

(22) PCT Filed: Apr. 14, 1999

(86) PCT No.: PCT/FR99/00870
§ 371 (c)(1),
(2), (4) Date: Dec. 7, 1999

(87) PCT Pub. No.: WO99/52824
PCT Pub. Date: Oct. 21, 1999

(30) Foreign Application Priority Data

Apr. 14, 1998 (FR) .............................. 98 04626

(51) Int. Cl.[7] .......................... H01M 6/00; H01M 4/58; C01B 13/14
(52) U.S. Cl. .................. 29/623.1; 429/231.1; 429/224; 429/231.95; 423/592.1; 423/599
(58) Field of Search .............................. 429/224, 231.9, 429/231.95, 223, 231.5, 224.215, 217; 29/623.1; 568/851; 252/182.1; 423/592.1, 599

(56) References Cited

U.S. PATENT DOCUMENTS

| | | | |
|---|---|---|---|
| 5,110,696 A | * | 5/1992 | Shokoohi et al. ............ 429/218 |
| 5,264,201 A | * | 11/1993 | Dahn et al. .................. 423/594 |
| 5,506,068 A | | 4/1996 | Dan et al. |
| 5,549,880 A | | 8/1996 | Koksbang |
| 5,597,664 A | | 1/1997 | Ellgen |
| 5,601,952 A | | 2/1997 | Dasgupta et al. |
| 5,955,051 A | * | 9/1999 | Li et al. ..................... 423/594 |
| 6,017,654 A | * | 1/2000 | Kumta et al. .............. 429/231.95 |

FOREIGN PATENT DOCUMENTS

WO  WO 94/25398  11/1994

OTHER PUBLICATIONS

K. Brandt, "Historical Development of Secondary Lithium Batteries," *Solid State Ionics*, 69(1994) 173–183. Month not available.
W.I.F. David, et al., "Structure Refinement of the Spinel–Related Phases $Li_2Mn_2O_4$ and $Li_{0.2}Mn_2O_4$," *Journal of Solid State Chemistry*, 67 (1987): 316–323.
E. Mengeritsky, et al., "Safety and Performance of Tadiran TLR–7103 Rechargeable Batteries," *J. Electrochem. Soc.*, Vol. 143, No. 7, 2110–2116 (Jul. 1996).
J.M. Tarascon, et al., "Li Metal–Free Rechargeable Batteries Based on $Li_{1+x}Mn_2O_4$ Cathode (0≤x≤1) and Carbon Anodes," *J. Electrochem. Soc.*, vol. 138, No. 10, 2864–2868 (Oct. 1991).

* cited by examiner

Primary Examiner—Stephen Kalafut
Assistant Examiner—R Alejandro
(74) Attorney, Agent, or Firm—Burns, Doane, Swecker & Mathis, L.L.P.

(57) ABSTRACT

This invention relates to a process for manufacturing a lithiated or overlithiated transition metal oxide comprising the following three steps, carried out successively or in a simultaneous manner:

preparation of a solution of lithium alkoxide by dissolving lithium metal in an alcohol, the said alcohol being chosen among the alcohols originating from linear or ramified alkanes comprising at least three carbon atoms, the alcohols originating from unsaturated aliphatic hydrocarbides, and mixtures of them;

addition of a transition metal oxide powder to the said lithium alkoxide solution to obtain a dispersion;

controlled reduction of the said transition metal oxide by the said alkoxide to obtain a lithiated or overlithiated transition metal oxide with a defined Li:Metal stoichiometry;

the said process also comprising the following steps:
evaporation of the residual alcohol,
rinsing of the powder thus obtained,
drying of the powder.

30 Claims, 5 Drawing Sheets

PROCESS FOR PREPARATION OF A LITHIATED OR OVERLITHIATED TRANSITION METAL OXIDE, ACTIVE POSITIVE ELECTRODE MATERIALS CONTAINING THIS OXIDE, AND A BATTERY

This invention relates to a process for preparation of a lithiated or overlithiated transition metal oxide, this lithiated or overlithiated oxide beneficially being usable as an active electrode material and more particularly for a positive electrode.

The invention also relates to the electrode, and particularly the positive electrode containing this material.

Finally, the invention relates to lithium batteries with a metallic or composite negative electrode using the said positive electrode.

The technical domain of the invention may generally be considered as being rechargeable Secondary Lithium Cells or Secondary Lithium Batteries.

A historical overview of the development of rechargeable secondary lithium batteries is given in the document by K. BRANDT "Historical Development of Secondary Lithium Batteries", Solid State Ionics 69 (1994), 173–183.

The operating principle of all lithium battery systems is the same: each time that the battery is charged or discharged, lithium in ionic form ($Li^+$) is exchanged between the positive and negative electrodes. The quantity of energy exchanged during each charge or discharge (supplied by the battery during discharge or supplied to the battery during charge) is exactly proportional to the quantity of lithium that can be exchanged during the electrochemical reaction.

This "exchangeable" lithium must be supplied by a lithium "source". This source is the negative electrode in the case of systems using a lithium metal negative electrode. For systems using a carbon based negative electrode which in principle does not contain any lithium by construction, the lithium source must be contained in the positive electrode. In this case, the active material in the positive electrode acts as the lithium source. Therefore, it can be seen that it becomes necessary to include the largest possible quantity of lithium in the active material of the positive electrode during its synthesis, in order to provide a sufficient reserve of lithium to obtain interesting electrochemical performances.

A cell is characterized by its operating voltage, which is determined by the potential difference between the negative electrode and the positive electrode. The absolute potential (non-measurable) of the negative electrode made of lithium metal is constant, since it is a pure metal.

Therefore, the voltage of a cell with a lithium metal negative electrode depends entirely on the potential of the positive electrode, which depends on the crystallographic structure of the active material in the positive electrode, and which changes as a function of the quantity of the lithium contained in it. As the cell discharges, the lithium enters the crystalline structure of this active material in which the potential drops regularly. The cell voltage drops. This is the reverse of what occurs during charging.

Active materials all have a different variation of their potential (with respect to Li/Li+) with time depending on the quantity of lithium contained in them; thus each active material has a characteristic "electrochemical signature". In some, lithium is inserted at between 3.5 and 4.5 Volts, for example as in the case of cobalt oxides for which the potential (with respect to Li/Li+) varies between 3.5 V (for $LiCoO_2$) and 4.5 Volts (for $Li_{1-x}CoO_2$, where x≈0.7 after the cell has been charged).

As another example, the potential (with respect to Li/Li+) of manganese oxides with a composition similar to $Li_{0.3}MnO_2$ used by TADIRAN Batteries Ltd. for batteries made using the technology described in patent U.S. Pat. No. 5,506,068 at which lithium is inserted is between 3.4 Volts (the composition of the active material in the positive electrode is then close to $Li_{0.3}MnO_2$) and 2 Volts (the composition of the active material in the positive electrode is then close to $LiMnO_2$). This is the "3 Volts Lithium-metal liquid electrolyte" system.

Other materials based on manganese oxides are more versatile; thus manganese oxides with a spinel structure usually have two operating potential "plateaus". For example for the compound with a spinel structure and formula $LiMn_2O_4$, most of the lithium is extracted from this structure at between about 3.2 Volts and 4.4 Volts (with respect to $Li/Li^+$) (the composition of the active material in the positive electrode after the charge to 4.4 Volts is then close to $Mn_2O_4$), whereas lithium can be inserted between about 3.2 Volts and 1.8 Volts in the $LiMn_2O_4$ structure (the composition of the active material in the positive electrode at the end of the discharge of the cell to 1.8 Volts is then close to $Li_2Mn_2O_4$).

Therefore, it can be seen that it is possible and even necessary to choose the active compound in the positive electrode to optimize the global performances of the system.

Lithium cells may be classified in different categories or systems, the first of these systems being the "3 Volts" lithium metal liquid electrolyte system.

Chronologically, the first lithium cells developed about 20 years ago used a lithium metal negative electrode.

Although these batteries provide high energy densities due to the large reserve of lithium contained in the negative electrode, this system was abandoned by most battery manufacturers due to the poor reconstitution of the metal surface at the negative electrode/electrolyte interface during charging and discharging cycles, resulting in inadequate lives (~200 cycles). Experience showed that dendritic growth phenomena (in the form of needles) appeared gradually during reconstitution of the lithium metal, during successive charging/discharging cycles. These needles eventually filled in the space between the negative electrode and the positive electrode after about 200 cycles, which caused internal short circuits.

However, some battery manufacturers have successfully limited this phenomenon. For example, the document by E. MENGERITSKY, P. DAN, I. WEISSMAN, A. ZABAN; D. AURBACH, "Safety and Performances of TADIRAN TLR-7103 Rechargeable Batteries", J. Electrochem, Soc, Vol. 143, No. 7, July 1996 describes a battery operating at between 2 and 3.4 volts with a lithium metal negative electrode and with a liquid electrolyte with an interesting life due to a new electrolyte formulation, but the life is nevertheless limited to about 500 charging/discharging cycles.

An additional improvement may be achieved by the use of a positive electrode material containing a larger quantity of lithium.

A different system called the 4 Volt "Lithium-ion" system was suggested at the beginning of the 1980s in order to overcome the difficulty caused by dendritic growth.

This system consists of substituting a carbon based lithium insertion compound to replace the lithium metal negative electrode.

In this case, the lithium metal negative electrode is replaced by an electrode containing a carbon based lithium insertion compound in which lithium is reversibly inserted during successive cycles, in exactly the same way as it does in the positive electrode insertion compound. This is the "4 Volt lithium-ION" system.

However, due to this choice:
the negative electrode is no longer capable of acting as a reservoir for the lithium necessary for the electrochemical reaction, which makes it essential to use a positive electrode compound containing lithium by construction.

part of the lithium originating from the positive electrode is irreversibly consumed by the carbon negative electrode the first time that the cell is charged (corresponding to the first time that lithium is inserted in the carbonated negative electrode) which results in an equivalent loss of capacity of the cell.

These limitations confirm that it would be useful to be able to synthesize a positive electrode active material containing the largest possible amount of lithium.

For example, up to now, the compounds based on manganese oxide with the best electrochemical characteristics in the "4 Volt lithium-ION" system described above, are products with a spinel structure and a composition similar to $LiMn_2O_4$. They enable electrochemical cycling between 3.2 and 4.4 Volts (with respect to $Li/Li^+$).

It can be seen that in this case some of the lithium contained in $LiMn_2O_4$ is irreversibly consumed by the negative electrode during the first charge. The usefulness of including an additional quantity of lithium by construction in the spinel structure of the compound $LiMn_2O_4$ can be seen, to provide an additional reserve of lithium.

Despite many attempts throughout the world, for example as described in the document by TARASCON J. M., GUYOMARD D., J. Electrochem.Soc, Vol 138, No. 10, 2804–2868, 1991, it has not been possible up to now to synthesize a compound with a spinel structure with formulation $Li_{1-x}MnO_2O_4$, where $0<x\leq 1$ using an economic and easily industrializable process.

This is why the use of materials based on manganese oxide as the active materials for positive electrodes has been severely limited in "4 Volt lithium-ION" cells.

This also explains that compounds selected for this "4-Volt Li-ION" system were essentially mixed oxides of lithium and cobalt (LiCoO2) or nickel ($LiNiO_2$).

These compounds do have the advantage that they can easily be synthesized by heat treatment of appropriate precursors while maintaining an acceptable energy density exceeding 100 Wh/kg. In this case, the relatively low quantity of lithium stored in the positive electrode (proportional to the I.t capacity) is compensated by the high operating voltage U close to 4 Volts (energy=U.I.t).

Since the end of the 1980s, most cell manufacturers have been developing this four Volt Lithium Ion Cell (4-Volts Li-ION) which associates a positive electrode compound of the cobalt oxide $LiCoO_2$ or nickel oxide $LiNio_2$ type operating between 3.5 and 4.5 Volts (with respect to $Li/Li^+$) and special carbonated negative electrode materials limiting the loss of capacity in the first cycle. These developments are described in the document by K.BRANDT mentioned above.

These systems confirm the energy densities of about 110 to 120 Wh/kg corresponding to an endurance of 170 to 200 km for an electrical vehicle, and with a life of close to 800 cycles.

The disadvantages of this type of battery are the high cost of cobalt and nickel oxides, and their energy density that, despite everything, remains low (compared with systems using a lithium metal negative electrode).

Therefore, in all cases (systems with a lithium metal or carbon based negative electrode), it appears that the use of a highly lithiated positive electrode active compound would be a significant factor towards improving the performances of the cell.

The existence of highly lithiated transition metal oxides has been demonstrated since in discharging cells, this type of compound is naturally introduced by the electrochemical insertion of the lithium ion in the positive electrode material.

The search for "artificial" synthesis processes has already explored several options.

The first of these options is synthesis in the solid phase making use of the reaction at different temperatures between salts or powders of transition metal oxides and lithium salts, but products with the required stocheometry and structure have never been obtained using this process.

The second of these options is synthesis by reaction using a reduction agent in solution. For example, this reduction agent could be lithium n-butyl or lithium iodide.

Reduction by lithium n-butyl was described by David W. I. F., Thackeray M. M., Picciotto L. A., Goodenough J. B., J. of Solid State Chemistry, 67, 316–323, 1987.

In this case, the lithiation reaction of manganese oxides by lithium n-butyl is very slow. It takes several days and uses a reagent, namely lithium n-butyl that is very expensive and dangerous since it is unstable in air.

The stoichiometry of the compounds obtained is difficult to control. The quantity of lithium n-butyl used must be close to the required stoichiometry. An excess of this reagent will result in excessive reduction of the transition metal oxide. Therefore, the reaction cannot be accelerated in this way.

The compounds obtained have a crystallographic structure approximately identical to the structure of compounds formed when lithium is inserted in the positive electrode compound when a cell is discharging, but they are not stable in air.

The reduction by lithium iodide was described by Tarascon J. M., Guyomard D., J. Of Electrochem. Soc, vol. 138, No. 10, 2864–2868, 1991.

The lithiation reaction of manganese oxides by lithium iodide is also fairly slow, since it takes about 24 hours and requires good control of the stocheometry of the reagents. However, the reaction can result in compounds stable in air with the required crystallographic structure, in other words similar to the structure obtained in a cell during discharge. Furthermore, lithium iodide is very expensive.

Document U.S. Pat. No. 5,549,880 describes the production of lithiated vanadium oxides starting from a lithium alkoxide prepared by reaction between lithine and a light alcohol such as ethanol or methanol. The final lithiated product is then difficult or even impossible to obtain since it becomes delithiated very quickly. The use of heavier alcohols results in extremely long reaction times.

Therefore, there is a need for a process for the preparation of a "lithiated or overlithiated" transition metal oxide that does not have the disadvantages and limitations of processes according to prior art, particularly concerning the reaction rate and the cost.

The purpose of the invention is to provide a process for the preparation of "lithiated or overlithiated" transition metal oxides that satisfies these and other requirements, and which overcomes the problems that occur with processes according to prior art.

This and other purposes are achieved according to the invention by a process for the preparation of a "lithiated or overlithiated" transition metal oxide comprising the following three steps, carried out successively or in a simultaneous manner:

Preparation of a solution of lithium alkoxide (alcoolate) by dissolving lithium metal in the corresponding alcohol, the said alcohol being chosen among the alcohols originating from linear or ramified alkanes comprising at least three carbon atoms, the alcohols originating from unsaturated aliphatic hydrocarbides, and mixtures of them;

Addition of a transition metal oxide powder to the said lithium alkoxide solution to obtain a dispersion;

Controlled reduction of the said transition metal oxide by the said alkoxide to obtain a "lithiated or overlithiated" transition metal oxide with a defined (required) Li:Metal stoichiometry; this stoichiometry is dependent of the composition and structure of the initial transition metal oxide;

Evaporation of the residual alcohol,

Rinsing of the powder thus obtained,

Drying of the powder.

"Overlithiation" means insertion of lithium in the structure of a commercial transition metal oxide before it is used in the positive electrode; the characteristics (chemical, crystallographic, electrochemical) of the "overlithiated" compound thus formed are similar to the characteristics of the product obtained by inserting lithium in the initial commercial oxide as it is generated during an infinitely slow discharge of the cell down to a voltage between the voltage (with respect to $Li/Li^+$) at which this initial oxide is abandoned and 1.0 Volt (with respect to $Li/Li^+$).

Lithiation, or a lithiated product, means any intermediate step between the initial product and the overlithiation corresponding to the overlithiated product defined above.

The process according to the invention is fundamentally different from processes according to prior art for the preparation of "lithiated or overlithiated" transition metal oxides in that it uses lithium alkoxides as reactional intermediaries, that according to an essential characteristic of the invention are obtained by dissolving lithium metal in a corresponding alcohol, this alcohol being derived from a linear or ramified alkane with at least three carbon atoms or an alcohol originating from an unsaturated aliphatic hydrocarbide. Obviously, any mixture of these alcohols in any proportions could be used.

The use of lithium alkoxides in the preparation of positive electrode compounds for lithium cells has certainly been mentioned before, but only for the preparation of lithiated vanadium oxides (Patent U.S. Pat. No. 5,549,880).

However, the process used in this document uses lithine LiOH and an alcohol as alkoxide preparation precursors, such that due to constants of the chemical equilibrium between LIOH and alcohols, the solution obtained cannot contain appreciable quantities of alkoxide unless the alcohol used is a light alcohol (essentially methanol or ethanol).

This document discourages the use of heavier alcohols and specifically recommends that methanol or ethanol should be used, as is the case in the single example given in this document.

The use of a heavier alcohol such as pentanol-1 in particular, under the conditions of the process according to this document starting from lithine, leads to the formation of very low concentrations of alkoxides in the solution, and therefore very low reaction rates.

The process according to this application demonstrates the need to use an alkoxide derived from the reaction between lithium and an alcohol produced by a linear or ramified alkane containing at least three carbon atoms or an alcohol derived from an unsaturated aliphatic hydrocarbide.

In general, it has been demonstrated that lithiated or overlithiated transition metal oxides are delithiated in ethanol, thus for example, we were able to demonstrate that an $LiMn_2O_4$ spinel lithiated by the process according to the invention in pentanol-1 becomes quickly delithiated during its residence in pure ethanol.

This confirms the predominance of the stability of lithium ethoxide compared with transition metal oxides lithiated or overlithiated by our process, and therefore conversely the impossibility of obtaining these same lithiated or overlithiated compounds in dispersion in a light alcohol solution such as ethanol or methanol.

Surprisingly, the preparation of alkoxide from lithium metal according to the first step of the process according to the invention, can result in concentrated solutions of lithium alkoxide even with alcohols containing three or more atoms of carbon, contrary to what is described in document U.S. Pat. No. 5,549,880.

Consequently, the rate of lithiation of transition metal oxide is faster, or is even instantaneous, and the efficiency is close to 1 due to the stronger reduction power of heavy alkoxides (originating from alcohols derived from linear or ramified alkanes with at least three atoms of carbon or alcohols derived from unsaturated aliphatic hydrocarbons), compared with light alkoxides.

The process according to the invention does not form part of the same domain as "mild" chemistry performed in solution and at low temperature.

The process according to the invention provides a solution to the problems that arise with processes according to prior art.

It only uses standard, inexpensive and easily available reagents that do not introduce any particular risks.

Unlike processes according to prior art, the process according to the invention also takes place quickly and there are few intermediate steps since the essential step in the process is the controlled reduction of the transition metal oxide.

The process according to the invention is sufficiently "mild" and precise so that the required stoichiometry can be achieved.

The reaction stops at a Li:metal stoichiometry that is perfectly defined by the choice of the alcohol, even in the presence of a large excess of alkoxide, and that depends on the composition and crystallographic structure of the initial transition metal oxide.

A perfectly defined stocheometry usually means an Li:metal ratio greater than or equal to 0.5, and preferably between 0.5 and 2.

The process according to the invention also has the advantage that it is significantly less expensive than the first other two processes according to prior art described above.

Thus, based on costs estimated by comparing prices per mole of lithiation reagents (mole of lithium), it was estimated that the cost of the process according to the invention would be about 18 times less than the cost of the process using lithium iodide and the reaction time would be about 20 times less, and the cost would be about 3 times less than the process using lithium n-butyl and the reaction time would be divided by at least 100.

The process according to the invention has the advantage that it can be carried out at low temperature; a low temperature usually means that the various steps can be carried out at ambient temperature (usually about 20° C.), as is the case for the preparation of the lithium alkoxide solution, the addition of metal oxide powder to the lithium alkoxide solution or rinsing of the powder obtained, or at a low temperature as in the case of controlled reduction which is usually carried out at a temperature of 50 or 70 to 260° C., which is approximately equal to the boiling temperature of the alcohol used (heated to reflux) or drying temperature which is usually 80 to 150° C.

Obviously, these temperature ranges may be lowered to ambient temperature or even lower, if the operations are carried out at low pressure instead of at atmospheric pressure.

The use of low temperatures makes it easy to obtain an electrochemically reversible compound with a perfectly defined Li:metal stoichiometry.

The invention will be better understood after reading the following description given for illustrative purposes and in no way restrictive, with reference to the attached drawings in which:

FIG. 1 is an X-ray diffraction diagram (ordinate=Intensity in arbitrary units, abscissa=2.theta in degrees, $\lambda$=1.5406 Å) showing the variation of the crystallographic structure of an initial spinel type compound with formula $Li_{1.29}Mn_{1.71}O_4$ where Li:Mn=0.75 (bottom diagram), after lithiation by the process according to the invention (top diagram) and insertion of 0.56 mole of Li as described in example 1.

FIGS. 2 and 3 show the first charging-discharging cycle and the first seven charging-discharging cycles respectively, for the cell in example 1, in which the abscissa shows the capacity C in mAh/g and the ordinate shows the voltage (U) in volts.

FIG. 4 is similar to FIG. 1 and shows the variation of the X-ray diffraction diagram ($\lambda$=1.78901 Å) during the lithiation observed in the example 2. Bottom diagram=initial compound $Li_{0.33}MnO_{2.03}$ ("TADIRAN" product). Top diagram: compound lithiated using the process according to the invention $Li_{0.33}MnO_{2.03}+0.70$ Li≈$LiMnO_2$).

Figure 1:
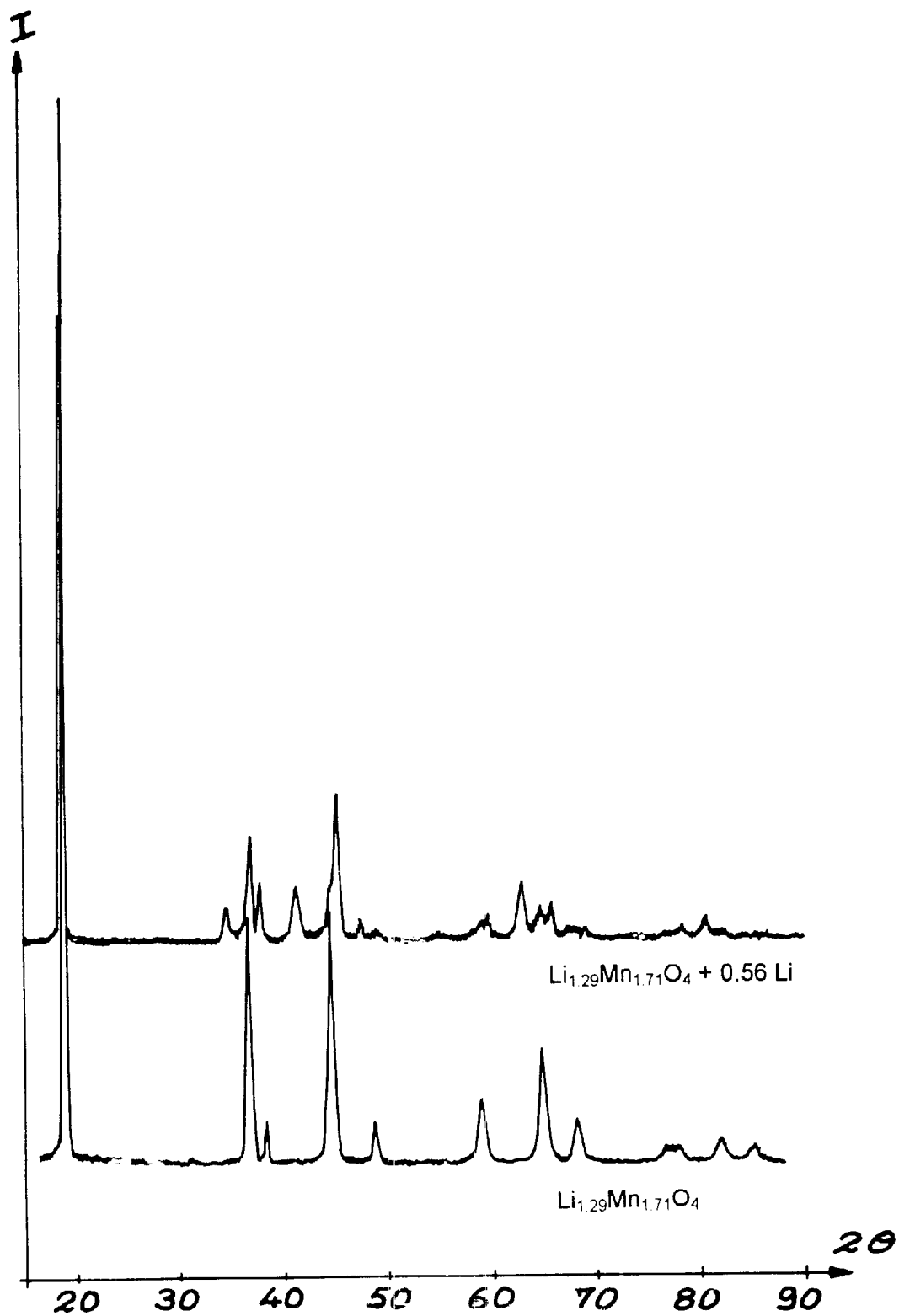

Therefore more precisely, the process according to the invention comprises the entire preparation of a solution of lithium alkoxide in the corresponding alcohol.

According to the invention, alcohol is chosen among alcohols derived from linear or ramified alkanes comprising at least three carbon atoms, and preferably 3 to 10 carbon atoms, and alcohols derived from unsaturated aliphatic hydrocarbides and their mixtures.

Pentanol-1 and isopropanol are preferred. The alcohol is usually in excess compared with lithium.

The lithium alkoxide solution is usually prepared by the addition of lithium metal in alcohol at ambient temperature (usually 20° C.) and under an inert gas atmosphere such as argon or dry air.

The concentration of the lithium alkoxide solution thus obtained is usually greater than or equal to 0.01 mole per liter, and is preferably 0.1 to 10 mole(s) per liter of lithium alkoxide.

A transition metal oxide powder is then added to the lithium alkoxide solution in the corresponding alcohol prepared during the first step, in order to obtain a dispersion.

The lithium alkoxide is usually in slight excess compared with the corresponding alcohol.

The said transition metal oxide is preferably chosen among transition metal oxides, in other words among V, Mn, Co, Ni, Ti oxides, the mixed oxides of these metals used with another metal for example chosen among alkaline and alkali-earth metals.

An oxide also includes all crystalline forms possible for the oxides mentioned above.

The process according to the invention is applicable to lithiation of any manganese oxide with an average degree of oxidation of the manganese equal to or greater than +3; examples of these include beta-$MnO_2$, gamma-$MnO_2$, epsilon-$MnO_2$, compounds with formulas similar to $Li_{0.3}MnO_2$ (for example the "TADIRAN" product $Li_{0.3}MnO_{2.03}$), $LiMn_2O_4$.

Beta-$MnO_2$ and $LiMn_2O_4$ both give $Li_2Mn_2O_4$ as the final product.

There are also manganese oxides with a spinel structure located within the domain of the Li, Mn, O phase diagram delimited by the $MnO_2$, $MiMn_2O_4$, $Li_4Mn_5O_{12}$ compositions.

This process is also applicable to all other transition metal oxides for example such as $V_2O_5$.

The controlled reduction step is usually carried out by heating the dispersion obtained in the previous step to reflux, and then by keeping it at reflux at atmospheric pressure and at the reaction temperature, therefore approximately equal to the boiling temperature of the alcohol used. Obviously, this boiling temperature can be varied with the working pressure.

The reaction is preferably carried out while stirring and under an inert atmosphere, preferably by nitrogen scavenging.

However, it may also be carried out at a pressure below atmospheric pressure, which reduces the boiling temperature of the alcohol used, so that the reaction can take place at a lower temperature.

If the alcohol used is pentanol-1, reflux can take place at atmospheric pressure at a temperature of 139° C., which is approximately equal to the boiling temperature of pentanol-1 at atmospheric pressure.

If pentanol-1 is chosen and it is decided to work at a pressure below atmospheric pressure, reflux is carried out at a temperature below 139° C., and typically at a temperature between ambient temperature and 139° C.

In the industrial stage, this reduction in the working temperature makes it possible to:

reduce production costs necessary to heat the solution, carry out the lithiation treatment at a lower temperature.

During this step, the alkoxide creates a controlled reduction of the transition metal oxide until a defined Li:metal stocheometry is obtained.

As already mentioned above, the three steps mentioned above can be carried out successively or simultaneously.

The next step consists of evaporating the solvent, in other words the residual alcohol; the temperature at which this step is carried out depends on the alcohol used and is usually 50 or 70 to 260° C. at atmospheric pressure.

The powder obtained is then rinsed in an appropriate liquid, for example in the alcohol previously used as a solvent (hexane, tetrahydrofurane) in order to eliminate any excess alkoxide, and the powder is then dried, usually under a partial vacuum, for example at a temperature of between 80 and 150° C. and preferably close to 150° C. during an appropriate period.

The drying temperature may be higher, namely 250° C. or even 400° C., provided that this does not change the structure of the product.

The purpose of drying is to eliminate impurities and other organic elements that are present on the surface of the product.

The process according to the invention may also include an additional heat treatment step carried out after drying.

Heat treatment is carried out at a temperature usually between 150° C. and 800° C. and preferably between 300° C. and 600° C., and even better between 300° C. and 500° C., for a period usually between 30 minutes and 3 hours, and preferably between 1 and 2 hours, usually under a neutral atmosphere.

This heat treatment, which must not be confused with drying, is intended essentially to modify the structure and/or electrochemical behavior of the lithiated or overlithiated material, if necessary.

Thus, using the process according to the invention for lithiating a raw product with composition $Li_{0.33}MnO_{2.03}$ such as that used by TADIRAN Batteries, results in the synthesis of a product with a composition close to $LiMnO_2$.

If a heat treatment is applied to this product under a neutral atmosphere at 250° C. for one hour, its structure is not modified, and it is equivalent to the structure of the initial TADIRAN product after being electrochemically discharged in a battery.

However, if a heat treatment is applied to the same product at a higher temperature, for example at 300° C. for 1 hour, a partial transformation of the initial structure into the $Li_2Mn_2O_4$ type quadratic spinel structure is observed. This product, composed of a mix of crystallographically disordered phases, has the specific feature that it has an interesting electrochemical behavior between 1.8 and 4.3 Volts.

This behavior is intermediate between the electrochemical behavior of TADIRAN products and the electrochemical behavior of $LiMn_2O_4$ type spinel structures.

Therefore, the relative importance of the electrochemical steps due to each of these phases can be modulated at will, thus providing a product in which the voltage during discharge varies more uniformly as a function of insertion of lithium than the voltage during discharge of each of the products taken separately.

The double plateau characteristic of spinel structures is no longer observed, and is replaced by a continuous and regular reduction in the discharge voltage as a function of the lithium insertion rate.

Thus, a complete range of new products can be synthesized (composed of mixes of the two lithiated structures) with interesting electrochemical characteristics.

The invention also relates to lithiated or overlithiated transition metal oxide that could be produced by the process described above.

This type of lithiated or overlithiated transition metal oxide is different from compounds according to prior art in that it is strongly lithiated with a high and perfectly defined Li:Metal stoichiometry, that it is stable and reverisble with regard to insertion and deinsertion of lithium.

A high Li:Metal stoichiometry usually means an Li:Metal ratio greater than or equal to 0.5, and perferably between 0.5 and 2.

The stability of the compound according to the invention corresponds to a stable formulation of the compound that in particular is only slightly affected by a prolonged residence in dry or ambient air (prolonged residence usually means residence longer than 24 to 240 hours) or by immersion in water.

This stability is defined by the observed stability of X-ray diffraction spectra and by the invariable nature of the degree of oxidation of the transition metal such as manganese.

This stability of the product according to the invention makes it easier to condition, store and manipulate the product.

The invention also relates to the use of a lithiated or overlithiated transition metal oxide described above as the electrode active material, and particularly the positive electrode active material.

The invention also relates to an electrode, comprising lithiated or overlithiated transition metal oxide as described above, as the active material before it is subject to any charge or discharge operation.

Preferably, the said electrode is a positive electrode.

Finally, the invention relates to a cell comprising this type of electrode and particularly a cell with a positive electrode comprising the lithiated or overlithiated transition metal according to the invention, before any charge or discharge operation has been applied to it.

In this final type of cell, the negative electrode may for example be a conventional composite negative electrode, for example a carbon based or tin based or $SnO_2$ electrode, or it may be a lithium metal or lithium alloy negative electrode, or any other suitable type of negative electrode.

The use of highly lithiated (lithiated or overlithiated) positive electrode compounds according to the invention in these cells can overcome problems related to insufficient energy densities and/or lives that were found previously in these batteries, as mentioned above.

Thus, in batteries using a composite negative electrode, lithiation or overlithiation of the positive electrode active material according to the invention compensates for the loss of capacity due to the use of a composite negative electrode to replace the lithium metal.

In other words, prior incorporation of lithium (in other words incorporation before the electrode has been charged or discharged) in the positive electrode active material according to the invention increases the total quantity of available lithium and therefore the energy density.

A gain of 10% in the energy density can be achieved, therefore correspondingly increasing the endurance of composite negative electrode batteries.

Similarly, in batteries using a lithium metal negative electrode, the cell is assembled in the discharged state, the reserve of lithium ions is already contained in the positive electrode material according to the invention and the cell begins its life by being charged, in other words by the lithium deposit derived from the active material of the positive electrode being deposited on the negative electrode, instead of a material removal, in other words material is not removed from the lithium metal negative electrode during the first discharge, thus improving the quality of the negative electrode/electrolyte interface during cycling.

In other words, part of the lithium is consumed the first time that the negative electrode is charged, whereas the rest of the lithium is used for the reversible electrochemical exchange during subsequent charging/discharging cycles.

The result is a better variation of the morphology of the negative electrode during the charging and discharging cycles, thus slowing dendritic growth (or needle shaped deposits). The loss of capacity or destruction of the cell due to internal short circuits is very much delayed.

The use of positive electrodes according to the invention in this type of cell results in an increase of 10 to 20% in the energy density of batteries, and is combined with an improved life.

Applications of the invention include all domains in which lithium batteries are used and in which good use can be made of the improved performances obtained due to the invention.

For example, this includes all types of portable equipment such as mobile telephones, camescopes, computers and electrical vehicles.

The invention will now be illustrated by means of the following examples given for illustrative purposes and which are in no way restrictive.

EXAMPLES

The following examples demonstrate the preparation of a transition metal oxide lithiated by the process according to the invention and its use in a cell as a positive electrode active material.

Example 1

Lithiation of an Initial Compound With a Cubic Spinel Structure

The formulation of this initial product is close to $Li_{1.29}Mn_{1.71}O_4$ with an Li:Mn ratio equal to 0.75 for an average degree of oxidation of manganese determined by the redox proportioning of +3.90, and a cubic mesh parameter close to 8.15 Angstroms. (The X diffraction diagram for this compound is shown in FIG. 1—bottom diagram).

This product was lithiated by the process according to the invention as follows. 600 ml of pentanol-1 (purity >99%) is added into a three neck flask with a capacity of 1000 ml. Argon is bubbled through alcohol while stirring gently for 1 hour at a temperature of close to 20° C. in this flask fitted with a condenser, the inside of the flask being isolated from the ambient atmosphere. 3.36 g (or 0.48 mole) of lithium metal in the form of chips is added into the alcohol. The lithium dissolves completely in the pentanol-1, and therefore the corresponding alkoxide is formed after two hours at ambient temperature. 34.8 g of spinel type manganese oxide (or about 0.4 mole of manganese), previously dried under a primary vacuum at 120° C. for one hour, is then added into the lithium alkoxide solution at ambient temperature.

The dispersion thus obtained is heated at atmospheric pressure to reflux at 139° C., namely the boiling temperature of pentanol, and is kept at this temperature for 6 hours.

Similarly, this dispersion may be heated to reflux at a lower temperature between ambient temperature and 139° C., if the operation takes place at a pressure below atmospheric pressure.

Once cooled to a temperature close to ambient temperature, the dispersion is filtered in ambient air on sintered glass.

The lithiated oxide is then rinsed with hexane, and is then dried under a primary vacuum at 300° C. for one hour.

The final lithiated product then contains manganese with an average degree of oxidation close to +3, representing the insertion of about 0.6 mole of lithium per mole of manganese with an Li:Mn ratio of 1.08.

The crystallographic structure of the lithiated compound determined by X-ray diffraction is a deformed spinel structure with quadratic mesh parameters a=b=5.691 Å and c=8.768 Å(c/(√2a)=1.09) (FIG. 1—top diagram). This is similar to the structure observed on compounds of the initial oxide type on which the lithium has been electrochemically inserted in a cell.

An 8 mm diameter positive electrode about 300 microns thick integrating the lithiated compound prepared above is obtained by pressing an intimate mixture composed of 55% by weight of lithium oxide, 30% by weight of carbon black and 15% by weight of graphite mass, under a force of 10 tonnes.

An electrochemical battery or cell with a lithium metal electrode is made using a conventional Swagelock® type assembly. The electrolyte used is a molar solution of lithium perchlorate in an equimolar mix of ethylene carbonate and dimethyl carbonate.

The separator used between the negative electrode and the positive electrode is a microporous film made of Celgard® type polypropylene.

Figure 2:
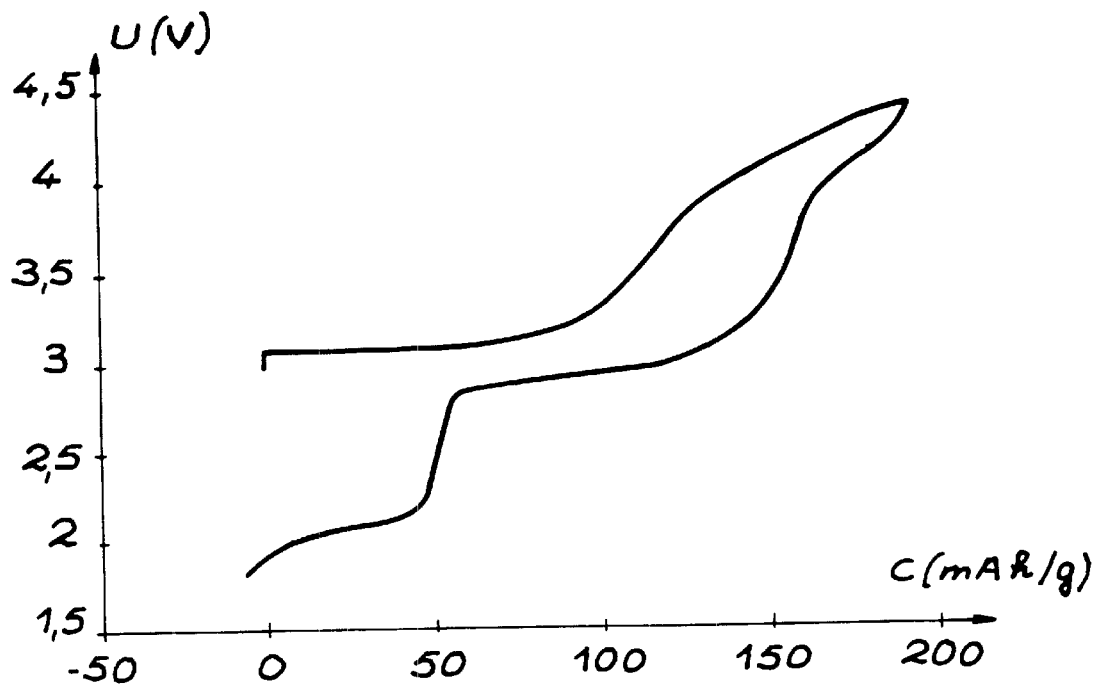
Figure 3:
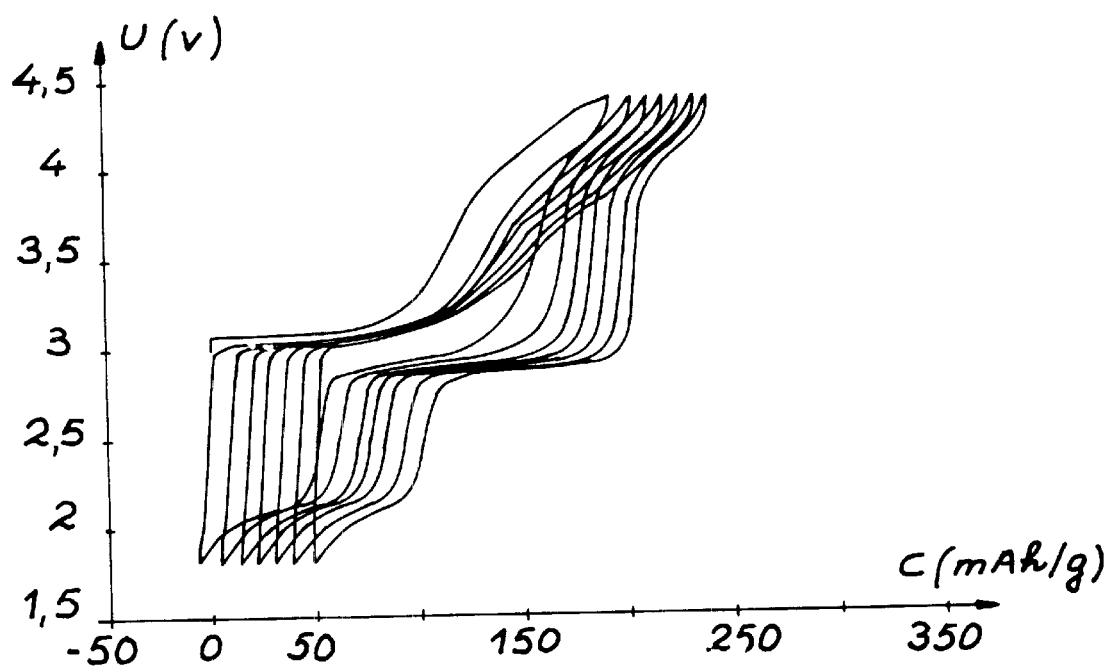

The behavior of this type of cell containing 10.8 mg of prelithiated product in the positive electrode, charged and discharged at 0.150 mA, is shown in FIGS. 2 and 3 (first charging/discharging cycle shown in FIG. 2; the first seven cycles shown in FIG. 3).

Example 2

Lithiation of the initial compound with a formulation close to $Li_{0.3}MnO_2$ ($Li_{0.33}MnO_{2.03}$) for an average degree of oxidation of the manganese determined by proportioning of +3.71, produced and used by TADIRAN Batteries Ltd in their 3V cells technology using lithium metal negative electrodes.

The operating method is the same as the operating method described in example No. 1, except that the drying time at 250° C. is limited to 1 hour.

Figure 4:
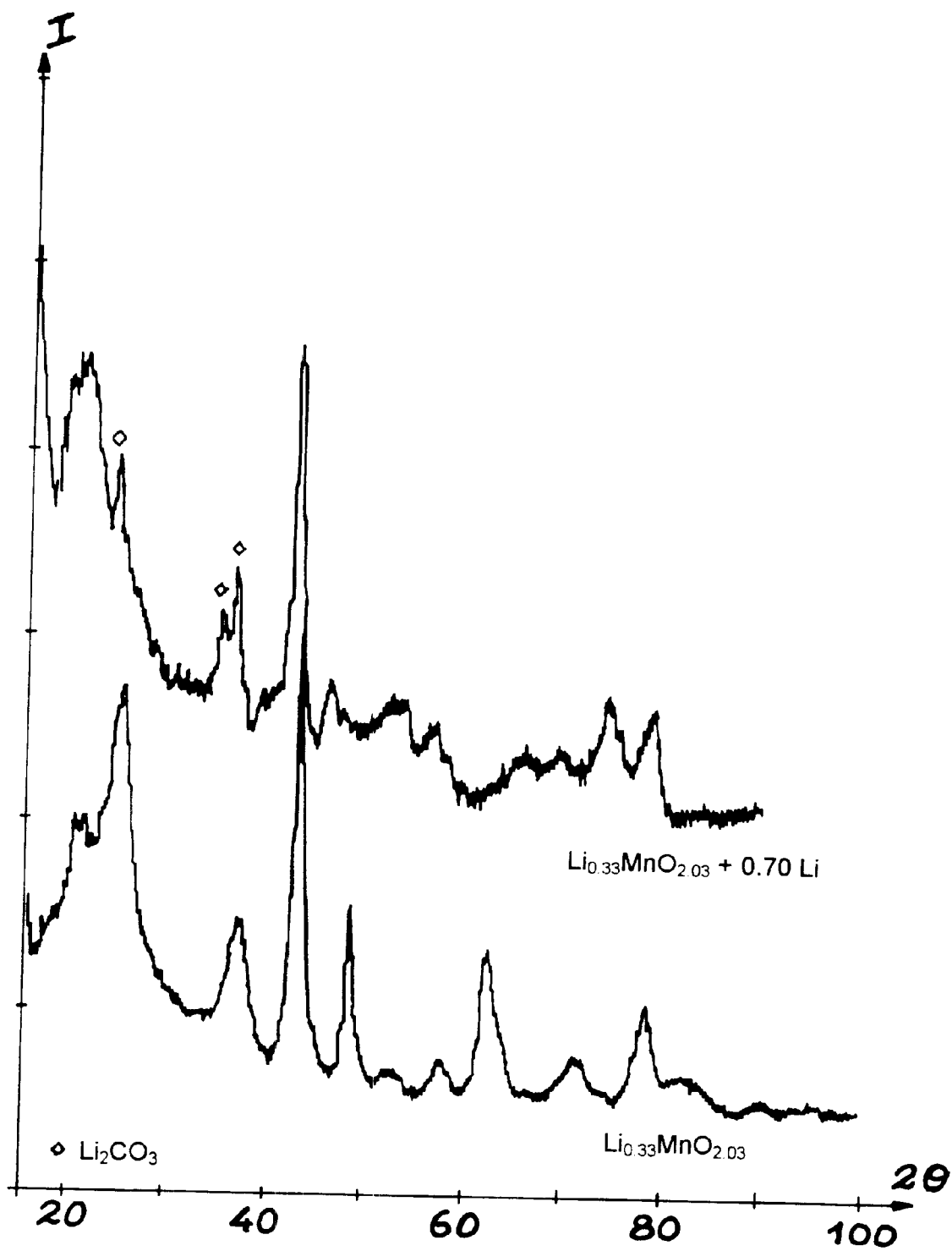

The lithiated compound thus obtained then contains manganese with an average degree of oxidation equal to +3.05, corresponding to the insertion of 3.71−3.05=0.66 mole of lithium per mole of manganese in the initial oxide, giving a final composition for the lithiated compound close to $Li_1MnO_2$. The variation of the RX diffraction diagram (λ1.78901 Å) due to lithiation is shown in FIG. 4.

Figure 5:
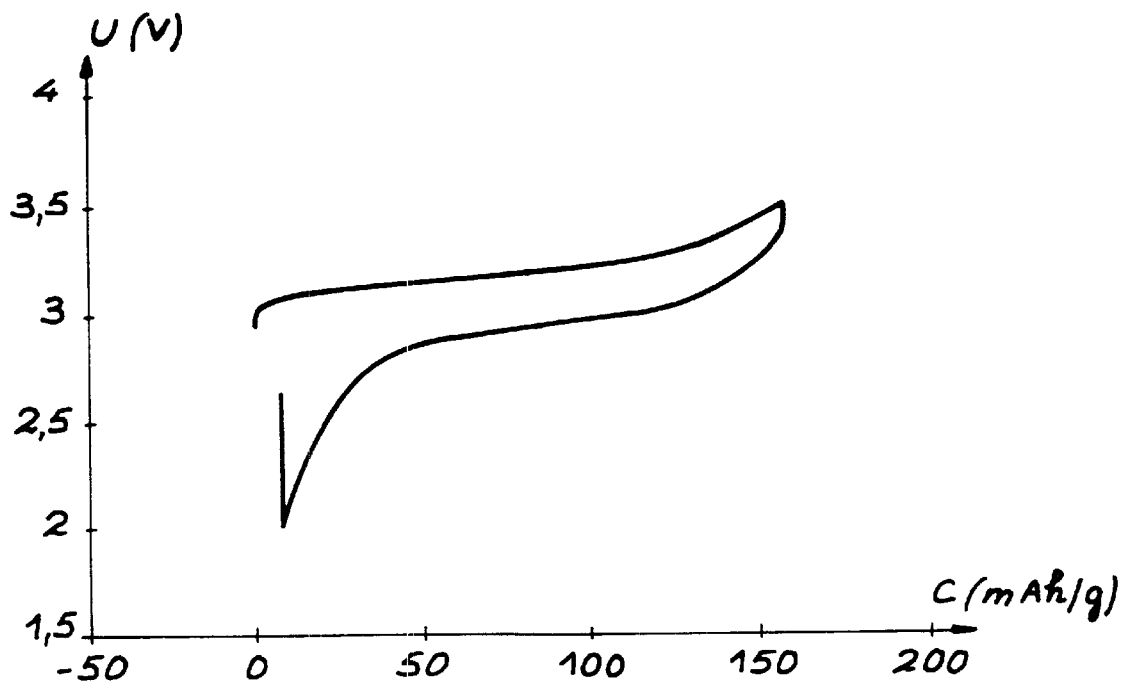
FIGS. 5 and 6 show the first charge and discharge cycle, and the first three charge and discharge cycles respectively, for the cell in example 2.
Figure 6:
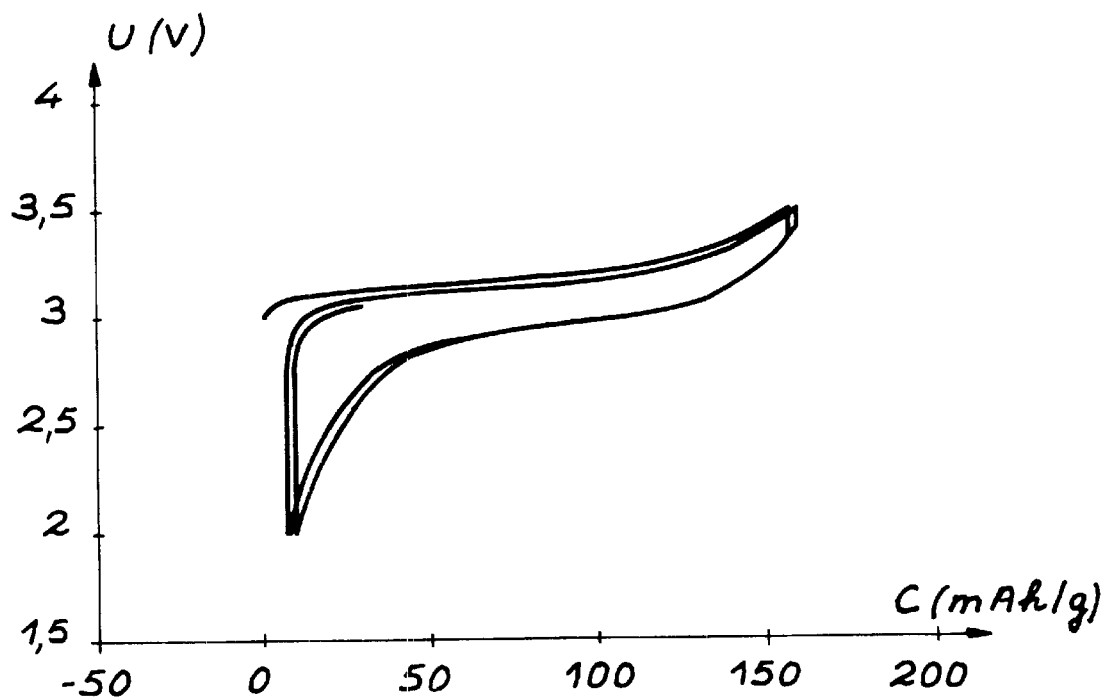

The behavior of a battery made in exactly the same way as that described in example 1 and containing 6.6 mg of lithiated product in the positive electrode, charged and discharged at 0.092 mA, is shown in figures No. 5 and 6 (FIG. 5 shows the first charging/discharging cycle, and FIG. 6 shows the first 3 cycles).

Example 3

Lithiation of the initial compound with a formulation similar to $LiMn_2O_4$ and spinel structure for a degree of oxidation close to +3.58, determined by proportioning and which is a material adapted to 4V use in an Li-ion battery.

This example illustrates the process according to the invention if the first three steps of the process are carried out simultaneously.

This product was lithiated by the process according to the invention as follows. 745 ml of pentanol-1 are added into a 3-neck flask with a capacity of 2000 ml. This flask is equipped with a condenser and the inside of the flask is isolated from the ambient atmosphere. Argon is bubbled through the slightly stirred alcohol at a temperature of close to 20° C. for 30 minutes. 0.52 g (0.075 mole) of lithium metal in the form of shot and 13.38 g of $LiMn_2O_4$ (0.145 mole) after being dried are added together into the alcohol. The contents of the reaction vessel are then heated while stirring using a flask heater. The lithium dissolves quickly and entirely at a temperature close to 110° C., such that the entire contents of the alcohol in the flask increases to the boiling point at a temperature of about 139° C. Boiling is then maintained by heating for 16 hours.

After cooling, the dispersion is centrifuged in a dry atmosphere in order to separate the powder from the liquid phase. The oxide powder is rinsed twice in hexane and is then dried at ambient temperature.

The final lithiated product then contains manganese with an average degree of oxidation close to +3.08, corresponding to insertion of 0.50 mole of lithium per mole of manganese with an Li:Mn ratio close to 1.04.

A 12 mm diameter positive electrode with a thickness of about 250 microns integrating the lithiated compound prepared above is obtained using an intimate mixture of 80% by weight of lithiated oxide, 7.5% by weight of graphite, 77.5% by weight of carbon black and 5% by weight of PTFE binder on an aluminum mesh. This electrode is then dried overnight under a partial vacuum at 150° C.

An electrochemical battery or cell with a lithium metal electrode is made using a CR2032 disk battery. The electrolyte is a molar solution of lithium hexafluorophosphate (LiPF6) in a mix consisting of 33% by weight of ethylene carbonate (EC) and 67% by weight of dimethoxyethane (DME) (for example LP32 electrolyte made by Merck). A Celgard type microporous polypropylene separator (made by Hoechst) is used between the two electrodes.

Figure 7:
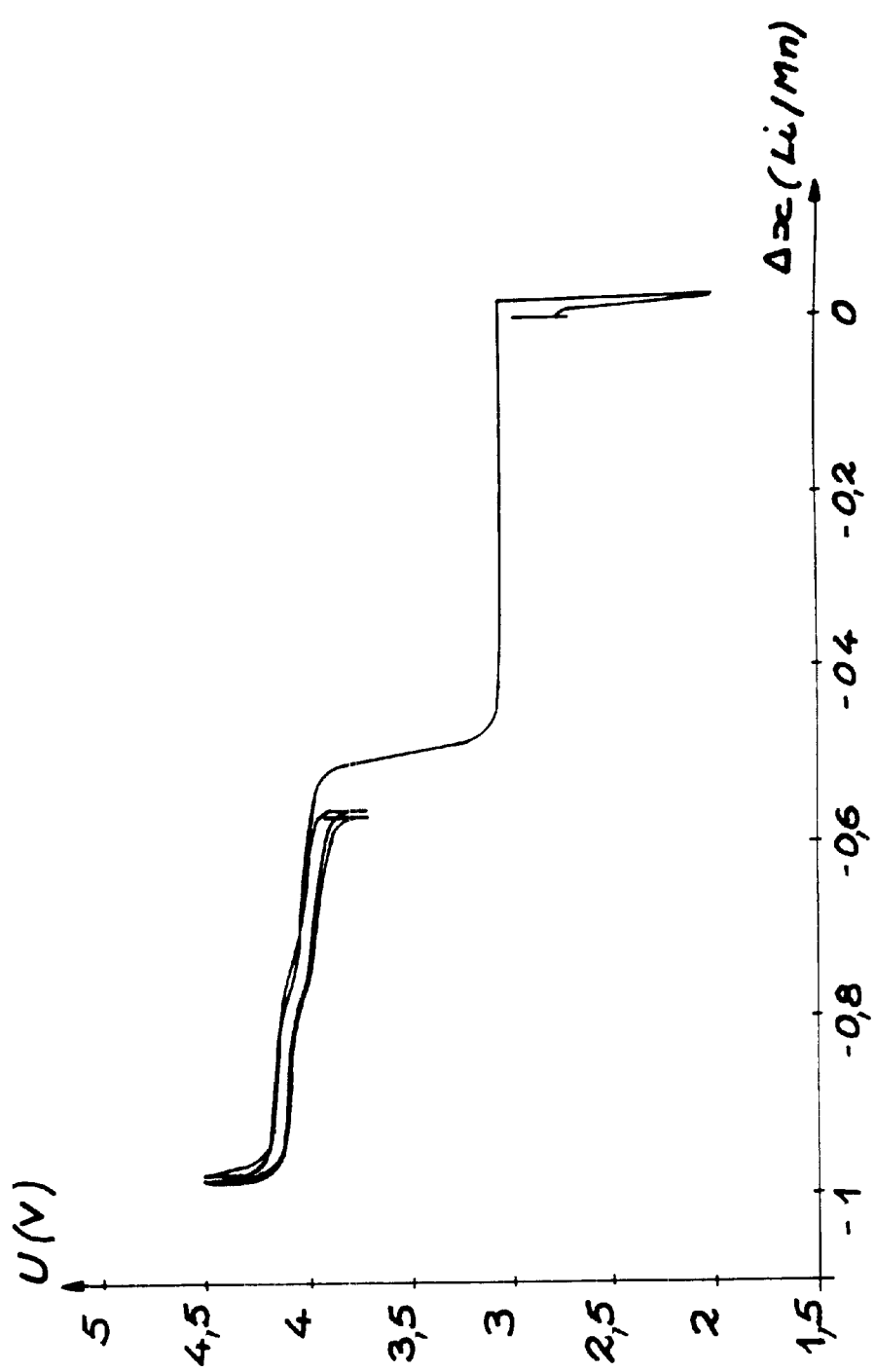
FIG. 7 illustrates the behavior of the cell in example 3, the voltage U in volts being shown as the ordinate and $\Delta x(Li/Mn)$ being shown as the abscissa.

The behavior of this type of cell containing 62.25 mg of prelithiated product in the positive electrode, charged at 0.4175 mA and discharged at 0.835 A is shown in FIG. 7.

What is claimed is:

1. Process for the preparation of a lithiated or overlithiated transition metal oxide comprising the steps of:
    (a) preparing a lithium alkoxide solution by dissolving metallic lithium in an alcohol of the formula R—OH wherein R is an alkyl group having at least 3 carbons;
    (b) adding a transition metal oxide powder to said lithium alkoxide solution to form a dispersion, wherein steps (a) and (b) are carried out successively or simultaneously, and thereafter;
    (c) controllably reducing said transition metal oxide with the lithium alkoxide until a lithiated or overlithiated transition metal oxide having a specified lithium to metal stoichiometry is formed, and thereafter;
    (d) recovering the lithiated or overlithiated transition metal oxide in powder form by a process comprising the steps of:
        (i) removing residual alcohol from the dispersion leaving the lithiated or overlithiated transition metal oxide powder;
        (ii) washing the powder; and
        (iii) drying the powder.

2. Process according to claim 1, wherein step c is carried out at atmospheric pressure and at a temperature of 50 to 260° C.

3. Process according to claim 1, wherein step c is carried out at a pressure below atmospheric pressure.

4. Process according to claim 1, wherein the alcohol was 3 to 10 carbons.

5. Process according to claim 4, wherein said alcohol is 1-pentanol or isopropanol.

6. Process according to claim 1, wherein step (a) comprises dissolving the metallic lithium in the alcohol at ambient temperature and in an inert gas atmosphere.

7. Process according to claim 6, in which alcohol is in excess with respect to the lithium.

8. Process according to claim 1, in which the said transition metal oxide is selected from the group consisting of transition metal oxides, mixed transition metal oxides, and mixture thereof.

9. Process according to claim 1, in which the said transition metal is selected from the group consisting of Mn, Co, Ni, and Ti.

10. Process according to claim 1, wherein step (c) comprises of adding the transition metal oxide powder to the lithium alkoxide solution, with the alkoxide being slightly in excess with respect to the alcohol.

11. Process according to claim 1, wherein step (c) comprises heating the dispersion obtained in the step (a) to reflux at atmospheric pressure or at a pressure below atmospheric pressure, and then keeping it at reflux at the reaction temperature, while stirring and under an inert atmosphere.

12. Process according to claim 1, further comprising an additional heat treatment step after step (d).

13. Process according to claim 12, in which the heat treatment is carried out at a temperature of between 150 and 800° C. for a duration of 30 minutes to 3 hours.

14. A process according to claim 1 wherein the lithiated or overlithiated transition metal oxide formed has two or more lithiated structures.

15. A process according to claim 14 wherein the lithiated or overlitiated transition metal oxide comprises $LiMnO_2$ and $LiMn_2O_4$.

16. A process according to claim 15 wherein the $LiMn_2O_4$ has a spinel structure.

17. Lithiated or overlithiated transition metal oxide obtained by a process that comprises the steps of:
    (a) preparing a lithium alkoxide solution by dissolving metallic lithium in an alcohol of the formula R—OH wherein R is an alkyl group having at least 3 carbons;
    (b) adding a transition metal oxide powder to said lithium alkoxide solution to form a dispersion, wherein the transition metal is Mn and wherein steps (a) and (b) are carried out successively or simultaneously, and thereafter;
    (c) controllably reducing said transition metal oxide with the lithium alkoxide until a lithiated or overlithiated transition metal oxide having a specified lithium to metal stoichiometry is formed wherein the lithiated or overlithiated transition metal oxide formed has two or more lithiated structures, and thereafter;
    (d) recovering the lithiated or overlithiated transition metal oxide in powder form by a process comprising the steps of:
        (i) removing residual alcohol from the dispersion leaving the lithiated or overlithiated transition metal oxide powder;
        (ii) washing the powder; and
        (iii) driving the powder,
wherein the lithiated or overlithiated transition metal oxide comprises $LiMnO_2$ and $LiMn_2O_4$.

18. Lithiated or overlithiated transition metal oxide obtained by the process according to claim 17 wherein the $LiMn_2O_4$ has a spinel structure.

19. Electrode including lithiated or overlithiated transition metal oxide according to claim 18, as active material before having been subjected to a first charge or discharge operation.

20. Electrode according to claim 19 for use as a positive electrode.

21. Battery comprising an electrode according to claim 19.

22. Battery comprising an electrode according to claim 20.

23. Battery including a positive electrode according to claim 20 and a composite negative electrode.

24. Battery comprising a positive electrode according to claim 20 and a negative electrode made of lithium metal or lithium alloy.

25. Electrode including lithiated or overlithiated transition metal oxide according to claim 17, as active material before having been subjected to a by first charge or discharge operation.

26. Electrode according to claim 25 for use as a positive electrode.

27. Battery comprising an electrode according to claim 25.

28. Battery comprising an electrode according to claim 26.

29. Battery including a positive electrode according to claim 26 and a composite negative electrode.

30. Battery comprising a positive electrode according to claim 26 and a negative electrode made of lithium metal or lithium alloy.

* * * * *